(12) United States Patent
Hehenberger

(10) Patent No.: US 7,816,798 B2
(45) Date of Patent: Oct. 19, 2010

(54) POWER TRAIN FOR A WIND POWER PLANT

(75) Inventor: Gerald Hehenberger, Klagenfurt (AT)

(73) Assignee: AMSC Windtec GmbH, Klagenfurt (AT)

( * ) Notice: Subject to any disclaimer, the term of this patent is extended or adjusted under 35 U.S.C. 154(b) by 0 days.

(21) Appl. No.: 12/482,912

(22) Filed: Jun. 11, 2009

(65) Prior Publication Data

US 2009/0302609 A1 Dec. 10, 2009

Related U.S. Application Data

(63) Continuation of application No. 11/658,325, filed as application No. PCT/AT2005/000302 on Aug. 1, 2005, now Pat. No. 7,560,824.

(30) Foreign Application Priority Data

Jul. 30, 2004 (AT) .............. A 1319/2004

(51) Int. Cl.
*F03D 9/00* (2006.01)
*H02P 9/04* (2006.01)
*F03B 13/00* (2006.01)
*F03B 13/10* (2006.01)

(52) U.S. Cl. .............. 290/44; 290/43; 290/53; 290/54; 290/55

(58) Field of Classification Search .......... 290/43, 290/44, 53, 54, 55
See application file for complete search history.

(56) References Cited

U.S. PATENT DOCUMENTS

| 2,376,523 | A | | 5/1945 | Synnestvedt ............ 416/102 |
|---|---|---|---|---|
| 3,617,020 | A | * | 11/1971 | Gerstine et al. .......... 244/17.27 |
| 3,837,442 | A | * | 9/1974 | Baermann ............... 188/159 |
| 4,160,170 | A | | 7/1979 | Harner et al. ........... 290/44 |
| 4,161,658 | A | | 7/1979 | Patrick ................. 290/44 |
| 4,239,977 | A | | 12/1980 | Strutman .............. 290/44 |
| 4,297,076 | A | | 10/1981 | Donham et al. ........ 416/37 |
| 4,298,313 | A | * | 11/1981 | Hohenemser ........... 416/98 |
| 4,329,117 | A | * | 5/1982 | Doman ................ 416/170 R |
| 4,330,743 | A | | 5/1982 | Glennon ............... 322/10 |
| 4,339,666 | A | | 7/1982 | Patrick et al. .......... 290/44 |
| 4,379,678 | A | | 4/1983 | Carlock et al. ......... 416/98 |
| 4,435,647 | A | * | 3/1984 | Harner et al. .......... 290/44 |
| 4,495,423 | A | * | 1/1985 | Rogers ................ 290/44 |
| 4,533,295 | A | | 8/1985 | Duchesneau .......... 416/27 |
| 4,557,666 | A | * | 12/1985 | Baskin et al. .......... 416/32 |

(Continued)

FOREIGN PATENT DOCUMENTS

EP 0120654 10/1984

(Continued)

*Primary Examiner*—T C Patel
*Assistant Examiner*—Pedro J Cuevas
(74) *Attorney, Agent, or Firm*—Occhiuti Rohlicek & Tsao LLP

(57) ABSTRACT

A power train for a wind power plant includes a rotor (1) for driving a gear (4), wherein the rotor blades (2) of the rotor are pivotally arranged around the longitudinal axis thereof on the hub of the rotor (1). A three-phase generator (5) is connected to the gear (4) and a power supply network (12). The gear (4) is also provided with an auxiliary variable speed drive (7). Each rotor blade (2) is provided with a drive for individually rotating around the longitudinal axis thereof for levelling the rotation speed and/or the torque of the power train.

15 Claims, 3 Drawing Sheets

U.S. PATENT DOCUMENTS

Figure 1:
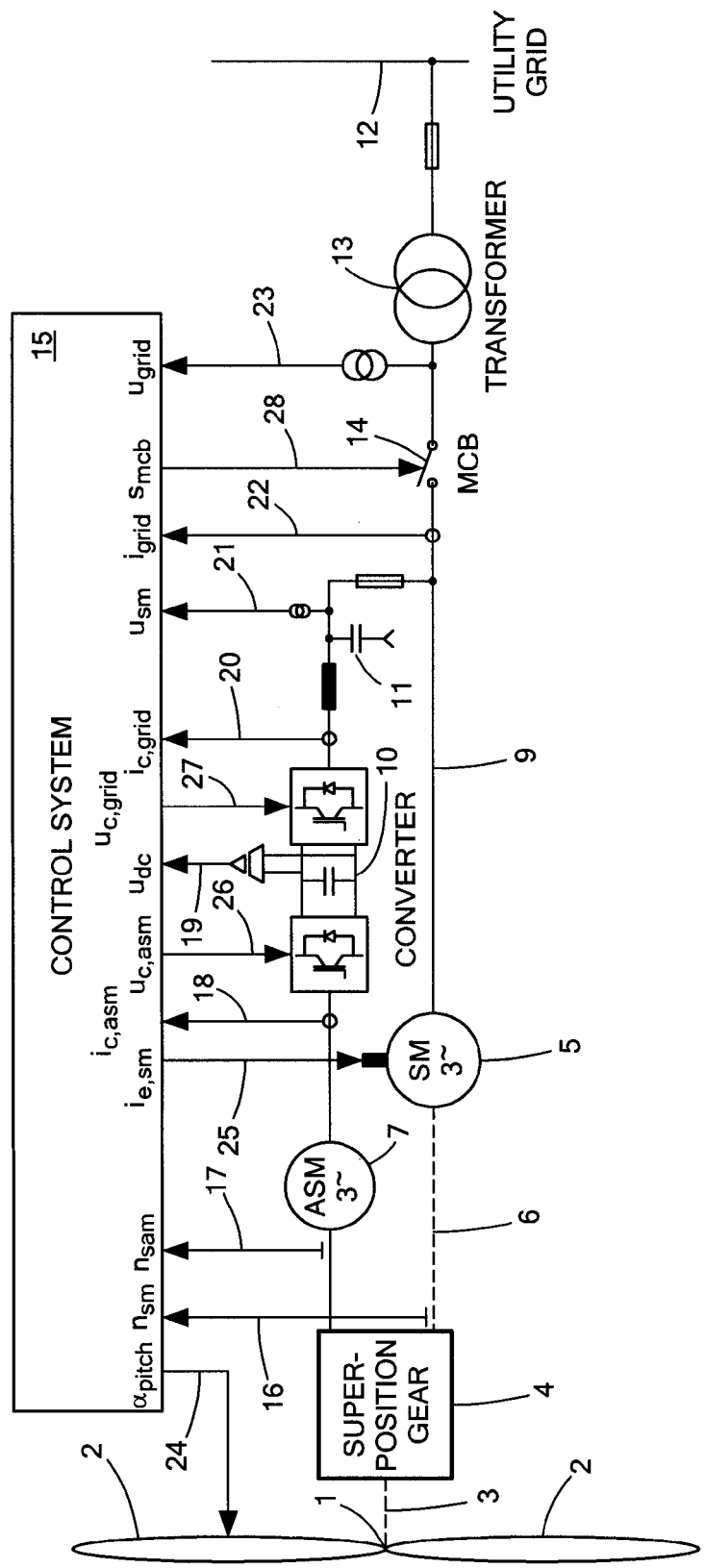

| | | | | |
|---|---|---|---|---|
| 4,565,929 | A * | 1/1986 | Baskin et al. | 290/44 |
| 4,636,707 | A | 1/1987 | Law et al. | 322/35 |
| 4,883,973 | A | 11/1989 | Lakey et al. | 290/31 |
| 5,011,373 | A | 4/1991 | Aubry et al. | 416/108 |
| 5,133,325 | A * | 7/1992 | Winkelmann | 123/559.3 |
| 5,140,170 | A | 8/1992 | Henderson | 290/44 |
| 5,213,470 | A | 5/1993 | Lundquist | 416/9 |
| 5,663,600 | A * | 9/1997 | Baek et al. | 290/55 |
| 5,667,047 | A * | 9/1997 | Weiss et al. | 192/55.61 |
| 5,690,321 | A * | 11/1997 | Seni et al. | 267/140.14 |
| 5,921,149 | A * | 7/1999 | Masberg et al. | 464/180 |
| 5,941,923 | A * | 8/1999 | Fischer et al. | 701/53 |
| 6,106,430 | A * | 8/2000 | Peinemann | 475/346 |
| 6,177,738 | B1 | 1/2001 | Hentunen et al. | 307/67 |
| 6,254,069 | B1 * | 7/2001 | Muramatsu et al. | 267/140.14 |
| 6,373,205 | B1 * | 4/2002 | Weimer et al. | 318/114 |
| 6,465,901 | B2 | 10/2002 | Croes | 290/55 |
| 6,619,918 | B1 | 9/2003 | Rebsdorf | 416/1 |
| 6,641,365 | B2 | 11/2003 | Karem | 416/1 |
| 6,870,281 | B2 | 3/2005 | Weitkamp | 290/55 |
| 7,042,110 | B2 * | 5/2006 | Mikhail et al. | 290/44 |
| 7,069,802 | B2 | 7/2006 | Mikhail et al. | 74/410 |
| 7,083,378 | B2 | 8/2006 | Hur | 415/4.3 |
| 7,445,431 | B2 | 11/2008 | Larsen et al. | 416/1 |
| 7,501,798 | B2 * | 3/2009 | Laubrock et al. | 322/32 |
| 7,699,150 | B2 * | 4/2010 | Frey et al. | 192/3.3 |
| 7,755,210 | B2 * | 7/2010 | Kammer et al. | 290/44 |
| 7,763,989 | B2 * | 7/2010 | Kinzie et al. | 290/44 |
| 2002/0154996 | A1 | 10/2002 | Karem | 416/1 |
| 2003/0075929 | A1 | 4/2003 | Weitkamp | 290/55 |
| 2004/0237683 | A1 | 12/2004 | Mikhail et al. | 74/410 |
| 2005/0012339 | A1 * | 1/2005 | Mikhail et al. | 290/44 |
| 2006/0145483 | A1 | 7/2006 | Larsen et al. | 290/44 |
| 2006/0153675 | A1 | 7/2006 | Rogall et al. | 415/170.1 |
| 2007/0007769 | A1 | 1/2007 | Basteck | 290/1 C |
| 2007/0176428 | A1 | 8/2007 | Nagao | 290/44 |
| 2007/0205602 | A1 * | 9/2007 | Willey et al. | 290/44 |
| 2007/0270052 | A1 | 11/2007 | Basteck | 440/6 |
| 2008/0054642 | A1 | 3/2008 | Nitzpon et al. | 290/44 |
| 2008/0054643 | A1 | 3/2008 | Nitzpon | 290/44 |
| 2008/0078228 | A1 * | 4/2008 | Nies | 73/1.01 |
| 2008/0247873 | A1 | 10/2008 | Egedal | 416/43 |
| 2008/0265846 | A1 * | 10/2008 | Laubrock et al. | 322/29 |
| 2008/0279685 | A1 | 11/2008 | Kessler et al. | 416/31 |
| 2008/0290664 | A1 | 11/2008 | Kruger | 290/55 |
| 2008/0298963 | A1 | 12/2008 | Egedal | 416/31 |
| 2008/0303281 | A1 * | 12/2008 | Krueger | 290/44 |
| 2009/0047116 | A1 | 2/2009 | Barbu et al. | 415/1 |
| 2009/0133529 | A1 * | 5/2009 | Kister et al. | 74/573.11 |
| 2009/0224543 | A1 | 9/2009 | Steudel et al. | 290/44 |
| 2009/0266160 | A1 | 10/2009 | Jeffrey et al. | 73/455 |
| 2009/0295161 | A1 * | 12/2009 | Steiner et al. | 290/44 |
| 2010/0117368 | A1 * | 5/2010 | Benito et al. | 290/55 |
| 2010/0133817 | A1 * | 6/2010 | Kinzie et al. | 290/44 |
| 2010/0207396 | A1 * | 8/2010 | Simon | 290/55 |
| 2010/0207589 | A1 * | 8/2010 | Heier | 322/59 |
| 2010/0215493 | A1 * | 8/2010 | Abdallah et al. | 416/23 |

FOREIGN PATENT DOCUMENTS

| | | |
|---|---|---|
| EP | 1995586 | 6/2001 |
| EP | 1548279 | 6/2005 |
| EP | 1631758 | 5/2008 |
| GB | 2023237 | 12/1979 |
| WO | WO 81/01444 | 5/1981 |
| WO | WO81/01444 | 5/1981 |
| WO | WO0244561 | 6/2002 |
| WO | WO 2008/149109 | 12/2008 |

* cited by examiner

POWER TRAIN FOR A WIND POWER PLANT

CROSS-REFERENCE TO RELATED APPLICATIONS

This application is a continuation of U.S. application Ser. No. 11/658,325 filed on Jan. 24, 2007 which is the National Stage of International Application No. PCT/AT2005/000302, filed on Aug. 1, 2005, which claims the priority of Austrian Application No. A1319/2004, filed on Jul. 30, 2004. The contents of the applications are hereby incorporated by reference in their entirety.

The invention relates to a power train of a wind power plant with a rotor as the drive for the gearing, on the rotor hub rotor blades which can be turned around their lengthwise axis being supported, with a three-phase generator which is connected to the gearing and to a power network and with a rpm-variable auxiliary drive for the gearing.

The invention relates furthermore to a process for controlling the rpm or the torque in a power train of a wind power plant in which a three-phase generator is driven by gearing which for its part is driven by a rotor shaft of a wind power plant and an auxiliary drive.

In wind power plants there is fundamentally the possibility of using synchronous generators and asynchronous generators to produce the current which is to be supplied to the power network.

In both versions there is the problem that the current generated by the generator must be exactly synchronized to the power network; this requires complex controls and circuits and converters which are not only expensive to produce, but are also subject to a more or less major power loss.

Furthermore drive torque fluctuations which are caused by nonuniform wind incidence have an adverse effect due to strong power fluctuations in feed into the power network.

To remedy this disadvantage, it has already been suggested that the gearing upstream of the generator be equipped with a rpm-variable auxiliary drive which can be operated both as a generator and also as a motor. This auxiliary drive which is attached to the gearing so-to-speak via a second drive shaft, is used to keep constant the output speed of the gearing to the synchronous generator; at high wind speeds and thus higher motor rpm this means that the auxiliary drive works as a generator, conversely at low wind speeds motor operation of the auxiliary drive is necessary.

The auxiliary drive for its part in the prior art is likewise connected to the generator shaft via a converter and another generator or motor which is coupled directly to the drive shaft of the three-phase generator. This requires not only high technical cost, but due to the two additional auxiliary drives or generators and the converter between the two this is also responsible for reducing the overall efficiency to a not inconsiderable degree.

Therefore the object of the invention is to make available a power train with the features of the preamble of claim 1 which manages with less complexity for the control of rpm and torque and reduces the load on the entire system.

This object is achieved with a power train with the features of claim 1.

This object is furthermore achieved with a process with the features of claim 11.

The invention takes the approach of making the rpm of the power train or the drive torque in conjunction with the auxiliary drive more uniform and reducing the load on the entire plant by individual control of the position of the rotor blades or parts of the rotor blades, i.e. their adjustment angle ("pitch") to the direction of rotation of the rotor or to the wind direction.

The combination of an auxiliary drive with the individual position control of the rotor blades furthermore leads to the fact that the auxiliary drive can be designed to be smaller with respect to its rated output. By effective use of the available wind moreover in motor operation smaller torques can be used, by which operation of the auxiliary drive of for example a 4-pole three-phase machine, even in the field weakening range (for example $-2000/\text{min}^{-1}$) becomes possible, conversely the auxiliary drive in generator operation is designed for a rpm range up to for example $+1500/\text{min}^{-1}$. Due to the greater rpm spread of the auxiliary drive a smaller rated output of the auxiliary drive becomes possible since the necessary output of the auxiliary drive is proportional to the rated output of the plant and to the rpm range (slip).

The auxiliary drive as claimed in the invention can additionally be used to damp power train vibrations which are caused by the internal power train dynamics. To do this, on the driven shaft of the gearing or on the drive shaft of the three-phase generator there is a measurement means for detecting the rpm and the torque. The vibrations detected thereby can be used for appropriately tuned driving of the auxiliary drive, by which the power train vibrations overall can be damped.

Alternatively or in addition, it is also possible for there to be a measurement means for detecting the rpm and the torque in the connection area of the auxiliary drive to the gearing and/or to the rotor shaft, since power train vibrations can also be easily detected at this point.

In one preferred embodiment of the invention, the auxiliary drive is an asynchronous machine which is connected to the power network via a converter. The required output in motor drive is therefore taken directly from the power network or reduces the power which is fed into the network by the three-phase generator. The generator output which arises at best is fed into the power network via the converter. Since the output of the auxiliary drive is low in any case, the converter can be dimensioned to be small and the power loss of the converter is therefore likewise small.

Alternatively the auxiliary drive can also be a hydrostatic or hydrodynamic drive or torque converter.

In one preferred embodiment the three-phase generator is a synchronous generator.

Other features and advantages of the invention derive from the following description of one preferred embodiment of the invention.

Figure 2:
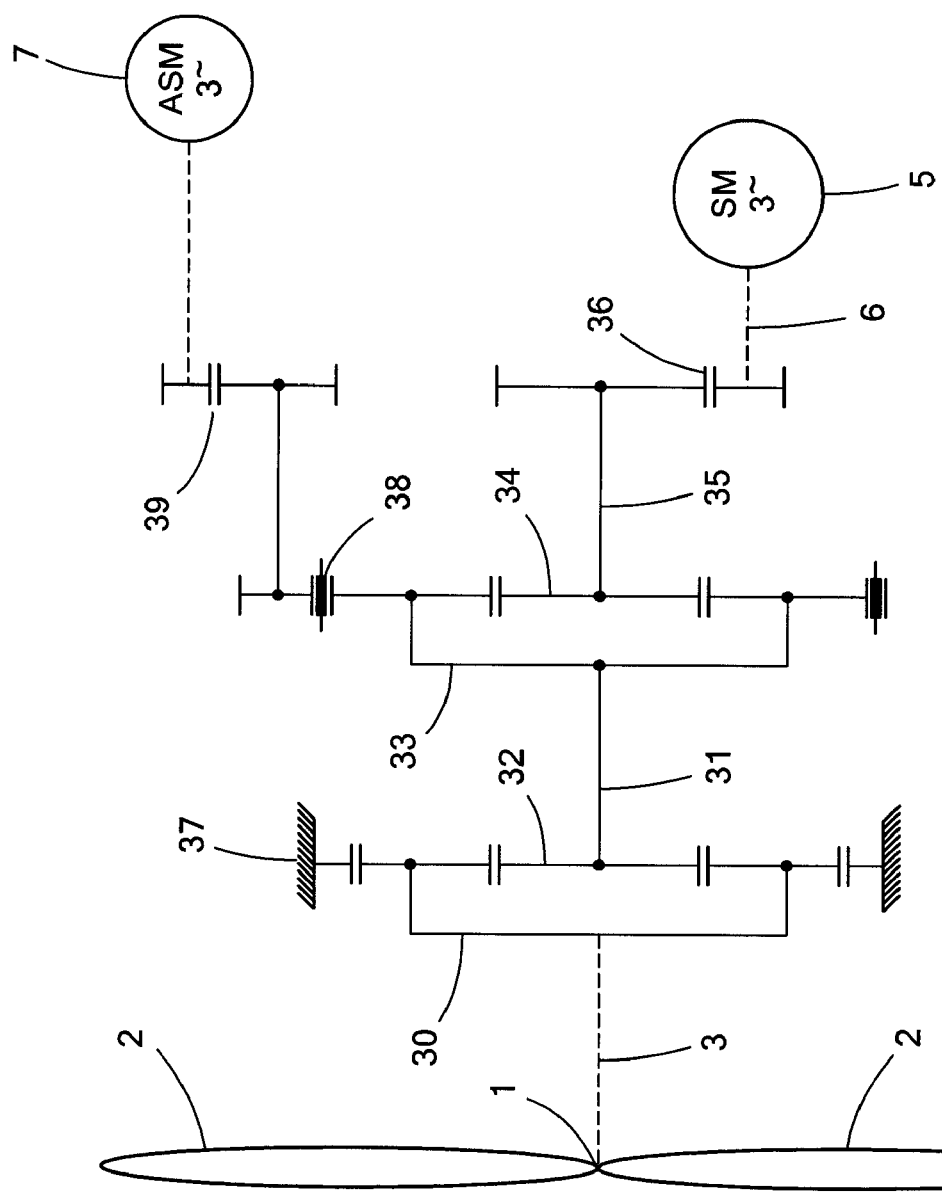
Figure 3:
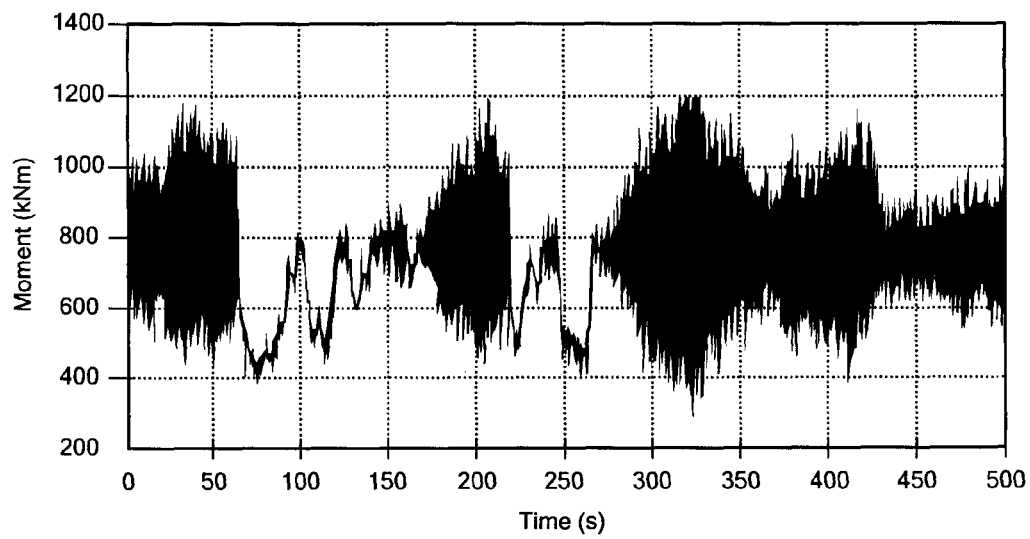
Figure 4:
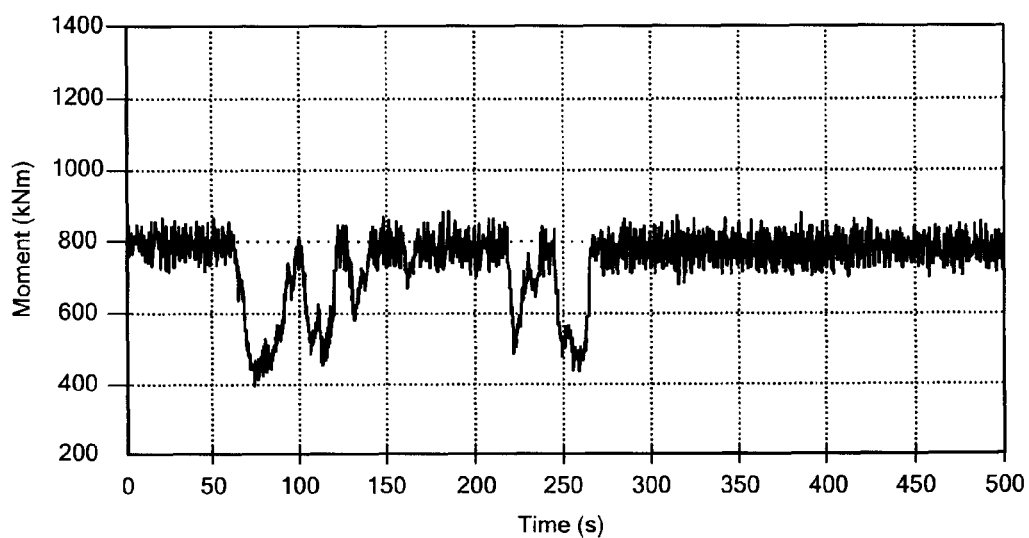

FIG. 1 shows a circuit diagram of a power train of a wind power plant as claimed in the invention, FIG. 2 schematically shows one embodiment of the power train with planetary gearing, FIG. 3 shows the characteristic of the torque over time without the rotor blade adjustment and power train damping as claimed in the invention and FIG. 4 shows the characteristic of the torque over time with the rotor blade adjustment and power train damping as claimed in the invention.

As FIGS. 1 and 2 schematically show, the rotor 1 with the rotor blades 2 drives gearing, preferably planetary gearing 4, via a rotor shaft 3. A three-phase machine, in this embodiment a synchronous machine 5, is connected to the planetary gearing 4 via a main shaft 6, and an auxiliary drive, for example in the form of an asynchronous machine 7, is connected to the planetary gearing 4 via an auxiliary shaft 8. The synchronous machine 5 is directly coupled to the power network via a line 9, conversely the asynchronous machine 7 is connected via a converter 10 and a network filter 11 to the line 9 and the power network 12. As usual a transformer 13 and a master switch 14 can be connected between the line 9 and the network 12.

The entire plant is controlled by a control unit 15. This control unit acquires the following data: Via lines 16 and 17 the rpm of the drive shaft 6 of the synchronous machine 5 and of the auxiliary shaft 8 of the asynchronous machine 7. Via the line 18 the current of the asynchronous machine. Via the line 19 the link voltage of the converter 10. Via the line 20 the network-side current. Via the line 21 the network-side voltage of the synchronous machine. Via the line 22 the network-side current and via the line 23 the network-side voltage.

From these data the control unit 15 computes the corresponding adjustment values for the control of the individual components of the power train. In particular via a line 24 the drives are individually adjusted, controlled with those of each rotor blade 2, i.e. it can be turned around its lengthwise axis. Via another line 25 the excitation of the synchronous machine 5 is controlled. Via two lines 26 and 27 the asynchronous machine-side and the network-side part of the converter 10 are controlled. The master switch 14 is turned on and off via another line 28.

Since the synchronous machine 5 is directly power network-coupled, its rpm are constant. At 50 Hz power network frequency the rpm of the synchronous machine is therefore 3000 min$^{-1}$/p. Depending on the number of pole pairs p the rpm can therefore be 3000 min$^{-1}$, 1500 min$^{-1}$, 1000 min$^{-1}$ and so forth. Since the wind power plant is to be operated with a variable rpm of the rotor 1, the auxiliary drive 7 is used to equalize the rpm between the rotor and the synchronous machine. An asynchronous machine (cage rotor) which is supplied via the converter 10 is used as the auxiliary drive. The converter is made as an voltage link converter in which the switching elements are for example IGTBs. Field-oriented control of the asynchronous machine 7 enables accurate and highly dynamic adjustment of the torque. The network-side part of the converter 10 is likewise made as a power inverter so that a power flow in both directions is possible, i.e. the asynchronous machine 7 can be used both as a generator and also as a motor. The coupling of the converter 10 to the power network 12 requires a network filter (sine wave filter) in order to limit the switching frequency harmonic currents of the converter to an allowable degree.

The rpm of the synchronous machine 5 is constant. The auxiliary drive 7 delivers the differential rpm and the differential output between the rotor 1 and the synchronous machine 5. At small rotor outputs and rotor rpm the auxiliary drive 7 operates as a motor, at higher outputs and speeds as a generator. In the embodiment of the power train as claimed in the invention the two manipulated variables for output control of the wind power plant are the blade angle of the rotor blades 2 ("pitch") and the torque or rpm of the auxiliary drive 7. The torque of the auxiliary drive 7 is proportional to the torque of the synchronous machine 5 and proportional to the torque of the rotor 1. Setting a certain torque on the auxiliary drive therefore corresponds to the torque setting on the synchronous machine 5.

At wind speeds below the nominal speed, which corresponds to the rotor output below the rated output, the blade angle of the rotor blades 2 is on average kept constant and the torque is adjusted proportionally to the square of the rotor rpm. Thus the rotor 1 is always operated with the best possible aerodynamic efficiency.

At wind speeds above the nominal speed, i.e. a rotor output above the rated output, the mean value of the torque of the synchronous machine is kept constant and using the adjustment of the blade angle of the rotor blades 2 a constant rpm or constant output is regulated, the setpoint which is stipulated for this purpose being the same for all rotor blades. In addition, additional values which are or can be individually controlled for each rotor blade can be superimposed on the indicated setpoint stipulations for the blade angle and the torque of the rotor 1 of the control of the individual rotor blades in order to improve the dynamic behavior and thus to reduce the load on the entire system. These additional influencing variables follow for example from the different wind speeds as a function of the height of the turning rotor blades over the ground and perturbation effects which arise in the area of the mast of the wind power plant.

The power network connection behavior of the synchronous machine 5 corresponds to that of a conventional power plant with a synchronous machine. The reactive power of the plant can be freely adjusted within the load limits by excitation of the synchronous machine. By power network voltage-dependent stipulation of the reactive power it is possible to contribute to voltage control in the power network. In the case of network disruptions (voltage dips) the known behavior of a synchronous machine occurs, i.e. the synchronous machine remains on the network and can supply a corresponding short circuit current. In this way the pertinent requirements of the transmission and distribution network operator (for example "E:ON Guideline") are easily satisfied without additional technical measures. The great short circuit contribution of the synchronous machine here ensures the operation of selective line protection in the usual way.

The rpm ranges of the synchronous machine 5 and of the asynchronous machine 7 can be set for example in a 2000 KW plant as follows:

| Rpm ranges: | | |
|---|---|---|
| Rotor | Synchronous machine | Asynchronous machine |
| $n_{min}$ = 10 min$^{-1}$ | n = 1000 min$^{-1}$ | $n_{min}$ = −2000 min$^{-1}$ |
| $n_{max}$ = 16.5 min$^{-1}$ | n = 1000 min$^{-1}$ | $n_{max}$ = 1500 min$^{-1}$ |

From the rpm equation n_SM≈≈72.92·n_Rotor≈−0.1354·n_ASM the torque equation M·SM={M_Rotor over {72.92}} M·ASM={M_Rotor over {538.6}} can be derived. This yields the following outputs at the rated rpm and rated torque:

Rotor: $P_R$=2000 kW (16.5 rpm, 1157.5 kNm)

Synchronous machine: $P_{SM}$=1662 kW (1000 rpm, 15.87 kNm)

Asynchronous machine: $P_{ASM}$=338 kW (1500 rpm, 2.15 kNm)

This shows that the rated output of the auxiliary drive 7 must be roughly only about 17% of the rated output of the plant so that overall an extremely stable feed behavior of the wind power plant into the power network results.

By exact measurement of the rpm and of the torque of the drive shaft 6 and/or of the auxiliary shaft 8 also power train vibrations which are caused by the dynamics of the power train itself can be detected very accurately. It thus becomes possible to control against these vibrations, i.e. to damp these vibrations by the auxiliary drive 7 tuned accordingly being driven such that the power train fluctuations are damped. The computation of these vibration-damping countermeasures likewise takes place in the control unit 15 which subsequently controls the converter 10 accordingly.

FIG. 2 schematically shows a power train as claimed in the invention in which three-stage gearing 4 is used. The first planet stage 4a is made conventionally, i.e. that the rotor shaft 3 as the drive shaft is connected to a planet carrier 30 and the driven shaft 31 to a sun wheel 32. The driven shaft 31 of the first gearing stage 4a is at the same time the drive shaft of the second gearing stage 4b which in turn is connected to a planet carrier 33. The driven shaft 35 of the second gearing stage 4b, which shaft is connected to the sun wheel 34, is connected to the drive shaft 6 of the synchronous machine via a third gearing stage 36.

While the ring gear 37 of the first gearing stage 4a is stationary, the ring gear 38 of the second gearing stage 4b can turn and is driven by the auxiliary drive 7 via a spur wheel stage 39 and a gearwheel 38. For this purpose the ring gear is provided with internal and external teeth. By turning the ring gear 38 with different speeds and different directions of rotation therefore the transmission ratio of the second gearing stage 4b can be changed such that the shaft 6 even at variable rpm of the rotor shaft 3 is always driven with constant rpm.

FIGS. 3 and 4 show fluctuations of the drive torque under turbulent wind conditions as the torque characteristic on the drive shaft 3 plotted over time. FIG. 3 shows the torque characteristic without individual rotor blade control and without power train damping, and FIG. 4 shows the torque characteristics with individual rotor blade control and with power train damping as claimed in the invention. Comparison of the two curve characteristics shows that the individual rotor blade control with power train damping causes the torque to become clearly more uniform mainly in the rated load range; this leads to the corresponding reduction of the loads and thus also optimized design of the gearing, the three-phase machine and the auxiliary drive.

The invention claimed is:

1. A power train of a wind power plant, said power train comprising:
   a rotor including a rotor hub and rotor blades supported on the rotor hub, the rotor blades configured to be turned around their lengthwise axis,
   gearing driven by the rotor,
   a three-phase generator connected to the gearing and to a network,
   an rpm-variable auxiliary drive connected to the gearing, and
   a detector for detecting vibration of the power train,
   wherein the auxiliary drive is configured to damp vibrations of the power train based on detected vibrations.

2. The power train of claim 1, further comprising a controller that receives input from the detector, and based on the input, controls the auxiliary drive to damp the vibrations of the power train.

3. The power train of claim 2, wherein the controller damps vibrations of the power train by tuned driving or braking of the auxiliary drive.

4. The power train of claim 1, wherein a drive shaft connects the three-phase machine to the gearing, and the detector detects the rpm of the drive shaft.

5. The power train of claim 1, wherein a driven shaft connects the auxiliary drive to the gearing, and the detector detects the rpm of the driven shaft.

6. The power train of claim 1, wherein known load fluctuations due to external forces are used for computation of the drive control.

7. The power train of claim 1, wherein the auxiliary drive is connected to the power network in parallel with the three-phase generator.

8. The power train of claim 1, wherein the auxiliary drive is an asynchronous machine that is connected to the power network via a converter.

9. The power train of claim 1, wherein the three-phase generator is connected directly to the network and the rpm-variable auxiliary drive is connected to a converter that is connected to the network.

10. The power train of claim 1, wherein a drive shaft connects the three-phase machine to the gearing, and the detector detects the torque of the drive shaft.

11. The power train of claim 1, wherein a driven shaft connects the auxiliary drive to the gearing, and the detector detects the torque of the driven shaft.

12. The power train of claim 1, wherein measured periodically recurring load fluctuations due to external forces are used for computation of the drive control.

13. The power train of claim 1, wherein periodically recurring load fluctuations due to external forces are used for computation of the drive control.

14. A power train for a wind power plant, said power train comprising:
   means for harnessing wind power to drive gearing;
   gearing driven by the means for harnessing wind power,
   a three-phase generator connected to the gearing and to a network,
   an rpm-variable auxiliary drive connected to the gearing, and
   means for detecting vibration of the power train,
   wherein the auxiliary drive is configured to damp vibrations of the power train based on detected vibrations.

15. The power train of claim 14, wherein the three-phase generator is connected directly to the network and the rpm-variable auxiliary drive is connected to a converter that is connected to the network.

* * * * *